(12) United States Patent
Zhang et al.

(10) Patent No.: US 10,957,915 B2
(45) Date of Patent: Mar. 23, 2021

(54) PLATINUM-BASED ALLOY CATALYST AND PREPARATION METHOD THEREFOR, MEMBRANE ELECTRODE, AND FUEL CELL

(71) Applicant: QINGDAO CHUANGQI XINNENG CATALYSIS TECHNOLOGY CO., LTD, Qingdao (CN)

(72) Inventors: Jie Zhang, Qingdao (CN); Xin Liang, Qingdao (CN); Hong Zhao, Qingdao (CN); Sung Lai Jimmy Yun, Qingdao (CN); Di Lu, Qingdao (CN)

(73) Assignee: QINGDAO CHUANGQI XSNNENG CATALYSIS TECHNOLOGY CO., LTD, Qingdao (CN)

(*) Notice: Subject to any disclaimer, the term of this patent is extended or adjusted under 35 U.S.C. 154(b) by 0 days.

(21) Appl. No.: 16/982,591

(22) PCT Filed: Mar. 22, 2019

(86) PCT No.: PCT/CN2019/079365
§ 371 (c)(1),
(2) Date: Sep. 21, 2020

(87) PCT Pub. No.: WO2019/179530
PCT Pub. Date: Sep. 26, 2019

(65) Prior Publication Data
US 2021/0020955 A1    Jan. 21, 2021

(30) Foreign Application Priority Data
Mar. 22, 2018  (CN) .......................... 201810239117.3

(51) Int. Cl.
*H01M 4/02*   (2006.01)
*H01M 4/92*   (2006.01)
(Continued)

(52) U.S. Cl.
CPC ............... *H01M 4/921* (2013.01); *C22C 5/04* (2013.01); *C22F 1/14* (2013.01); *C23F 1/30* (2013.01);
(Continued)

(58) Field of Classification Search
CPC ...................................................... H01M 4/02
See application file for complete search history.

(56) References Cited

U.S. PATENT DOCUMENTS

2015/0238906 A1* 8/2015 Krauss ................ B01D 69/145
428/220
2018/0281060 A1* 10/2018 Yang .................... B22F 1/0085

FOREIGN PATENT DOCUMENTS

| CN | 101432907 A | 5/2009 |
| CN | 104475126 A | 4/2015 |

(Continued)

OTHER PUBLICATIONS

Ruixiang Feng, Research on Environmental-friendly Anodic Fuel for Fuel Cell, Sep. 2015, pp. 19-20, Huazhong University of Science and Technology Press.
(Continued)

*Primary Examiner* — Jacob B Marks
(74) *Attorney, Agent, or Firm* — Bayramoglu Law Offices LLC (57) ABSTRACT

The disclosure includes a platinum-based alloy catalyst and a preparation method thereof, a membrane electrode and a fuel cell. The method for preparing the platinum-based alloy catalyst comprises the following steps: (1) preparing nano-sized alloy particles of platinum and 3d transition metal; (2) carrying out acid treatment on the alloy particles prepared in step (1); and (3) annealing the alloy particles treated in step (2). The size of the platinum-based alloy particles is controlled, an atom number ratio of platinum to transition metal
(Continued)

in the platinum-based alloy is controlled, and then etching and dissolution of acid is combined so that an atom number ratio of platinum to transition metal is further controlled, subsequently annealing is carried out at high temperature. The prepared platinum-based alloy catalyst improves the stability and durability of the platinum-based alloy catalyst, which supports the large-scale application of the platinum-based alloy catalyst in the fuel cell.

10 Claims, 5 Drawing Sheets

(51) Int. Cl.
    *C23F 1/30*     (2006.01)
    *C22F 1/14*     (2006.01)
    *C22C 5/04*     (2006.01)
    *H01M 8/1018*     (2016.01)

(52) U.S. Cl.
    CPC .... *H01M 4/926* (2013.01); *H01M 2008/1095* (2013.01)

(56) References Cited

FOREIGN PATENT DOCUMENTS

| | | |
|---|---|---|
| CN | 105268453 A | 1/2016 |
| CN | 105642309 A | 6/2016 |
| CN | 109004242 A | 12/2018 |

OTHER PUBLICATIONS

Yuen Wu et al., A Strategy for Designing a Concave Pt-Ni Alloy through Controllable Chemical Etching, Angewandte Chemie, 2012, pp. 12692-12696, 124.

Chunyu Du et al., Platinum-based intermetallic nanotubes with a core-shell structure as highly active and durable catalysts for fuel cell applications, Journal of Power Sources, 2013, pp. 630-635, 240.

\* cited by examiner

PLATINUM-BASED ALLOY CATALYST AND PREPARATION METHOD THEREFOR, MEMBRANE ELECTRODE, AND FUEL CELL

CROSS REFERENCE TO THE RELATED APPLICATIONS

This application is the national phase entry of International Application No. PCT/CN2019/079365, filed on Mar. 22, 2019, which is based upon and claims priority to Chinese Patent Application No. 201810239117.3, filed on Mar. 22, 2018, the entire contents of which are incorporated herein by reference.

TECHNICAL FIELD

The disclosure pertains to the technical field of fuel cells, and particularly relate to a platinum-based alloy catalyst and a preparation method thereof, a membrane electrode and a fuel cell.

BACKGROUND

A proton exchange membrane fuel cell (PEMFC) is a core of hydrogen energy economy. PEMFC converts chemical energy into electric energy by means of cool combustion of hydrogen, and water is a unique effluent. Since over-potential is high in the oxygen reduction reaction of a cathode of PEMFC, a noble metal platinum catalyst is capable of effectively reducing over-potential, thereby realizing the efficient utilization of hydrogen energy. However, the noble metal platinum catalyst is expensive in price, if the amount of platinum in the cathode catalyst is reduced and then production cost is reduced, it will be a key to realize large-scale commercial application of PEMFC. At present, it has been proven that alloying of platinum and 3d transition metal is an effective means to reduce the amount of platinum. However, transition metals (such as Ni, Co and Fe) in the alloy catalyst are extremely easy to lose, which not only causes great reduction in the oxygen reduction activity of the catalyst but also reduces the proton conduction effectiveness of a proton exchange membrane due to lost metal positive ions. Therefore, it is urgent to improve the durability of the platinum-based alloy catalyst in the field of fuel cell catalysts.

SUMMARY

The technical problem to be solved by the disclosure is to overcome the defects in the prior art and provide a method for preparing an improved platinum-based alloy catalyst. The method is capable of preventing transition metals from losing in work environments, thereby realizing that the properties of the platinum-based alloy catalyst in the process of long-term use, such as electrochemical activity area, oxygen reduction specific activity, oxygen reduction mass activity, are basically kept unchanged, and ensuring that the platinum-based alloy catalyst is durably used in the long term.

Provided is a method for preparing a platinum-based alloy catalyst, comprising the following steps:
(1) preparing or providing nano-sized alloy particles of platinum and 3d transition metal;
(2) carrying out acid treatment on the alloy particles prepared in step (1); and
(3) annealing the alloy particles treated in step (2).

In one embodiment, the alloy particles are supported on a nitrogen-doped carbon carrier.

In one embodiment, supporting the alloy particles on a nitrogen-doped carbon carrier is carried out by the following steps:
carrying out acid treatment activation on the carbon carrier, subsequently uniformly mixing with a nitrogen-containing compound, and carrying out heat treatment for 2 h-10 h in an inert gas atmosphere at 500° C.-1000° C. to obtain the nitrogen-doped carbon carrier; and
depositing platinum alloy nano particles on the nitrogen-doped carbon carrier to obtain a nitrogen-doped carbon carrier deposited with the platinum alloy nano particles.

In one embodiment, supporting the alloy particles on a nitrogen-doped carbon carrier is carried out by the following steps:
providing or preparing a carbon carrier deposited with platinum alloy nano particles; and
uniformly mixing the carbon carrier deposited with the platinum alloy nano particles with the nitrogen-containing compound, and then carrying out heat treatment for 2 h-10 h in an inert gas atmosphere at 500° C.-1000° C. to obtain the nitrogen-doped carbon carrier deposited with the platinum alloy nano particles.

In one embodiment, the heat treatment is carried out in an oxygen-containing atmosphere.

In one embodiment, before the step of uniformly mixing the carbon carrier deposited with the platinum alloy nano particles with the nitrogen-containing compound, the carbon carrier deposited with the platinum alloy nano particles is soaked into acid liquid for predetermined time.

In one embodiment, in step (1), an atom number ratio of platinum to 3d transition metal in the prepared alloy particles is controlled to be 1: (1-5).

In one embodiment, in step (1), the size of the prepared alloy particle is controlled to be 2 nm-6 nm.

In one embodiment, in step (2), an atom number ratio of platinum to 3d transition metal in the alloy particles subjected to acid treatment is controlled to be 1: (0.1-0.8).

In one embodiment, in step (2), the acid treatment is carried out at 40° C.-90° C.

In one embodiment, in step (2), the acid treatment is carried out on the alloy particles using an acidic aqueous solution having a concentration of 0.1 mol/L-2 mol/L.

In one embodiment, in step (3), the annealing temperature is 100° C.-300° C., and the annealing time is controlled to be 4 h-20 h.

In one embodiment, in step (3), the annealing is carried out in air.

In one embodiment, the 3d transition metal is one or a combination of more of iron, cobalt and nickel.

In addition, provided is a platinum-based alloy catalyst, the platinum-based alloy catalyst being prepared by the method for preparing the platinum-based alloy catalyst.

In one embodiment, the platinum-based alloy catalyst comprises a nitrogen-doped carbon carrier and platinum alloy nano particles supported on the surface of the nitrogen-doped carbon carrier, and the platinum alloy particle comprises a platinum alloy core and a platinum shell coating on the surface of the platinum alloy core;
preferably, the thickness of the platinum shell is 0.5 nm-1.5 nm;
preferably, the mass percentage of the platinum alloy core in the platinum alloy nano particle is 40%-75%.

In one embodiment, the platinum-based alloy catalyst comprises a nitrogen-doped carbon carrier and platinum alloy nano particles supported on the surface of the nitrogen-doped carbon carrier, and the mass percentage of nitrogen in the nitrogen-doped carbon carrier is 1%-30%;

preferably, the size of the nitrogen-doped carbon carrier is 100 nm-25 μm, the specific surface area of the nitrogen-doped carbon carrier is 200 $m^2$/g-1500 $m^2$/g;

preferably, the mass percentage of the platinum alloy nano particles in the platinum-based alloy carrier is 30%-50%;

preferably, in the platinum alloy nano particles, a molar ratio of platinum to 3d transition metal is 1:3-5:1.

Also provided is a membrane electrode, comprising the above platinum-based alloy catalyst.

Also provided is a fuel cell, comprising the above membrane electrode.

Since the above technical solution is adopted, compared with the prior art, the disclosure has the following beneficial effects:

According to the disclosure, the size of the platinum-based alloy particle is controlled, the atom number ratio of platinum to transition metal (such as Ni, Co and Fe) in the platinum-based alloy is controlled, then etching and dissolution of acid is combined to further control the atom number ratio of platinum to transition metal, followed by annealing at high temperature, and thus the prepared platinum-based alloy catalyst improves the surface structure of particles, is capable of greatly preventing or even avoiding the loss of transition metal in work environment so as to improve the stability and durability of the platinum-based alloy catalyst, thereby providing a significant support for the large-scale application of the platinum-based alloy catalyst in the fuel cell.

DETAILED DESCRIPTION OF THE EMBODIMENTS

For more clearly understanding the above purpose, features and advantages of the disclosure, the embodiments of the disclosure will be described in detail in combination with drawings. The following descriptions describe many specific details so as to sufficiently understand the disclosure. However, the disclosure can be implemented in many other manners different from those described herein. Those skilled in the art can make similar improvements without departing from the contents of the disclosure, and therefore the disclosure is not limited by the disclosed embodiments below.

Unless other defined, the meaning of all the technical and scientific terms used herein are the same as those commonly understood by those skilled in the art. Herein, the terms used in the Description of the disclosure are only for the purpose of describing the embodiments but not intended to limit the disclosure. the terms "and/or" used herein includes one of relevant listed items or any and all combinations thereof.

Aiming at the problems that the platinum-based alloy catalyst in the prior art is poor in durability and easy lost during the work, and can also affect the proton conduction efficiency of the proton exchange membrane, the disclosure provides the technical solution of the disclosure. In the embodiment of the disclosure, a specific preparation method of a platinum-based alloy catalyst is provided. By the method, the size of the platinum-based alloy particles and the atom number ratio of platinum to 3d transition metal are controlled. In the further embodiment, the 3d transition metal in the alloy particles is etched and dissolved by acid solution, and then annealing treatment is carried out under high temperature, so that the surface structure of the platinum-based alloy particles is improved and the loss of the 3d transition metal is prevented or even avoided, and furthermore there is barely even no agglomeration phenomenon between the platinum-based alloy particles, platinum is enriched on the surface. In the stability cycle test of the long-term fuel cell, the atom number ratio of platinum to 3d transition metal, electrochemical activity area, oxygen reduction specific activity and oxygen reduction mass activity and other properties are basically kept unchanged, the stability of the platinum-based alloy catalyst is greatly improved so that the catalyst can be suitable for realizing large-scale commercial application.

In the process of research, the inventor of the disclosure also found: the properties of the platinum-based alloy catalyst are mainly affected by the surface structure and component distribution of the catalyst, the further main obstacles are that the precise regulation of element distribution in the nano level is difficult to realize. For example, the existing technology generally uses high-temperature annealing to overcome the platinum-based alloy catalyst. However, high temperature easily causes particle sintering and loss of electrochemical surface area while improving the specific activity. In addition, the surface of the nano material enriches corn and edge sites, the nano material has small coordination coefficient, easily adsorbs oxygen-containing functional groups (for example —OH), thereby resulting in activity loss of oxygen reduction reaction (ORR) towards to the molecule oxygen, and finally leading to reduction of activity of the catalyst and decrease of service life with the migration of low coordination points. In one embodiment of the disclosure, a method for preparing a platinum-based alloy catalyst comprises the following steps:

(1) preparing or providing nano-sized alloy particles of platinum and 3d transition metal;

(2) carrying out acid treatment on the alloy particles prepared in step (1); and (3) annealing the alloy particles treated in step (2).

Preferably, the alloy particles are supported on a nitrogen-doped carbon carrier.

Preferably, the preparation method for preparing the platinum-based alloy catalyst in one embodiment of the disclosure comprises the following steps:

S10, providing or preparing the carbon carrier deposited with the platinum alloy nano particles, wherein the platinum nano particle comprises platinum and at least one 3d transition metal.

Preferably, the platinum alloy particle is at least one selected from a platinum-cobalt alloy nano particle, a platinum-nickel nano particle and a platinum-iron-sodium alloy particle.

Preferably, the platinum alloy particle also comprises one or two of manganese, iridium, rhodium, niobium and zirconium.

Preferably, the size of the platinum alloy particle ranges from 3 nm-6 nm.

Wherein, the 3d transition metal refers to a metal whose last electron is arranged on a 3d rail when electrons of atoms are arranged. For example, cobalt, nickel, iron and other metals.

In one preferred embodiment, supporting the alloy particles on the nitrogen-doped carbon carrier is carried out by the following steps:

S1, uniformly mixing the carbon carrier subjected to acid treatment activation with the nitrogen-containing compound, and carrying out heat treatment for 2 h-10 h in the inert gas atmosphere at 500° C.-1000° C. to obtain the nitrogen-doped carbon carrier.

Preferably, the size of the carbon carrier is 100 nm-25 μm.

Wherein, acid treatment activation refers to increasing the quantity of functional groups and defects on the surface of the carbon carrier through acid treatment, thereby increasing the doping amount of nitrogen.

Wherein, the nitrogen-containing compound is preferably urea or ammonium. These nitrogen-containing compounds are cheap, safe and convenient to use.

Preferably, the heat treatment is carried out in an oxygen-containing atmosphere. Wherein, the oxygen-containing atmosphere can be pure oxygen or air. Since being in the oxygen-containing atmosphere, after heat treatment, the 3d transition metal on the surface layer can be oxidized into an oxide, and this part of 3d transition metal is more easily consumed when subsequent acid treatment is used.

S2, depositing the platinum alloy nano particles on the nitrogen-doped carbon carrier to obtain the nitrogen-doped carbon carrier deposited with the platinum alloy nano particles.

In another preferred embodiment, supporting the alloy particles on the nitrogen-doped carbon carrier is carried out by the following steps:

S3, providing or preparing the carbon carrier deposited with the platinum alloy nano particles.

Wherein, the carbon carrier deposited with the platinum alloy nano particles can be prepared by using the following steps: depositing the platinum alloy nano particles on the carbon carrier to obtain the carbon carrier deposited with the platinum alloy nano particles.

Wherein, the carbon carrier includes but is not limited to a carbon nano tube, a carbon nano fiber, mesoporous carbon, a carbon ball or graphene and other conductive materials.

Preferably, depositing the platinum alloy nano particles on the carbon carrier is as follows: the carbon carrier, a platinum precursor and at least one 3d transition metal precursor are added into a solvent and then uniformly mixed, and then a reducing agent is added to sufficiently react to obtain the carbon carrier deposited with the platinum alloy nano particles.

Wherein, the solvent can be glycol, water, methanol or ethanol. Wherein, addition of the reducing agent can allow reduction of a metal salt. The reducing agent for example can be $NaBH_4$, ascorbic acid or citric acid.

S4, uniformly mixing the carbon carrier deposited with the platinum alloy nano particles with the nitrogen-containing compound, and then carrying out heat treatment for 2 h-10 h in the inert gas atmosphere at 500° C.-1000° C. to obtain the nitrogen-doped carbon carrier deposited with the platinum alloy nano particles.

Step S4 can simultaneously realize nitrogen doping and alloying. After heat treatment, nitrogen doping can be realized, and meanwhile the stability of the platinum alloy nano particles is improved.

In the above preferred embodiments, the nitrogen-doped carbon carriers deposited with the platinum alloy nano particles are obtained. In the nitrogen-doped carbon carrier, the nitrogen atom is introduced into a sp2 hybridized structure, which can significantly improve the physical and chemical properties such as electron characteristics and surface alkalinity of the carbon material. Furthermore, the nitrogen-containing group can increase the activity sites of the surface of the carbon material absorbing metal particles and stabilize the metal nano particles, thereby being beneficial to obtaining a high-dispersion metal supported catalyst.

Further, before the step of uniformly mixing the carbon carrier deposited with the platinum alloy nano particles with the nitrogen-containing compound, the step of carrying out acid treatment on the carbon carrier deposited with the platinum alloy nano particles is also included. The purpose is to simultaneously carry out activation and 3d transition metal consumption on the carbon carrier and the platinum alloy particles.

S20, consuming the 3d transition metal on the surface layer of the platinum alloy nano particles through acid treatment, and then carrying out heat treatment for 1 h-20 h at 100° C.-300° C. to obtain the platinum-based alloy catalyst. The acid treatment refers to soaking the nitrogen-doped carbon carrier deposited with the platinum alloy nano particles into the acid solution and then taking out the carbon carrier after maintaining for a while. Wherein, stirring can be added in the soaking process. The acid treatment is conductive to improvement of the stability of the alloy catalyst.

Wherein, acid used in the process of acid treatment is preferably at least one of acetic acid, sulfuric acid, nitric acid and perchloric acid. Preferably, the pH of the acid treatment environment is less than 1, the acid treatment temperature is 50° C.-80° C., and the acid treatment time is 1 h-12 h.

After heat treatment in step S20, the surface defects of the catalyst can be reduced, and the distribution of platinum on the surface layer of the catalyst is increased.

Preferably, the heat treatment in step S20 is carried out in the oxygen-containing atmosphere. Since 3d transition metals which are not consumed may be remained on the surface layer of the product after acid treatment, after heat treatment is carried out in the oxygen-containing atmosphere, this residual 3d transition metal part continues to be oxidized. After being reduced in the subsequent use process, this oxidized 3d transition metal part is removed, thereby reducing the residue of the 3d transition metal on the surface layer.

Of course, the heat treatment in step S20 are not limited to the above atmospheres, and can also be carried out in an oxygen-free atmosphere.

More further, the heat treatment after the carbon carrier deposited with the platinum alloy nano particles are uniformly mixed with the nitrogen-containing compound is defined as first heat treatment, and heat treatment after the 3d transition metal on the surface layer of the platinum alloy nano particles is consumed is defined as second heat treatment;

The temperature of first heat treatment is 600° C.-800° C., and the time of first heat treatment is 2 h-6 h; the temperature of second heat treatment is 150° C.-250° C., and the time of first heat treatment is 1 h-8 h. Through the first heat treatment and the second heat treatment in combination with the above temperatures and time, the catalytic activity and stability of the finally prepared platinum-based alloy catalyst can be both good.

Through the method for preparing the above platinum-based alloy catalyst, after twice heat treatment, the platinum alloy nano particles supported on the surface of the nitrogen-doped carbon carrier are stable and regularly arranged. The nitrogen atom can be introduced into the sp2 hybridized structuare by uniformly mixing the carbon carrier with the nitrogen-containing compound and then carrying out first heat treatment, so that the physical and chemical properties such as electronic characteristics and surface alkalinity of the carbon material can be greatly improved, the nitrogen-containing group can increase the active sites of absorbing the metal particles on the surface of the carbon material and stabilize the metal nano particles, thereby facilitating the obtaining of the high-dispersion metal supported catalyst. Through second heat treatment, the surface defects of the catalyst can be reduced, the distribution of platinum on the surface layer of the catalyst can be increased so that platinum more easily binds to the nitrogen-doped carbon carrier, thereby improving the stability. Specifically, through first heat treatment in the oxygen-containing atmosphere, the 3d transition metal on the surface layer can be oxidized into the oxide; by combining with the subsequent acid treatment, this 3d transition metal part can be more easily consumed. By adopting the above preparation method, the prepared platinum-based alloy catalyst is good in catalytic activity and stability, and beneficial to industrialized application.

It is noted that, the method for preparing the platinum-based alloy catalyst according to the disclosure is not limited to the above technical solution, and the following technical solutions are also adopted:

T1, providing or preparing the carbon carrier deposited with the platinum alloy nano particles; wherein, the platinum alloy nano particle comprises platinum and at least one 3d transition metal.

T2, carrying out acid treatment on the carbon carrier deposited with the platinum alloy nano particles to obtain the carbon carrier deposited with the platinum alloy nano particles subjected to acid treatment.

T3, uniformly mixing the carbon carrier deposited with the platinum alloy nano particles subjected to acid treatment with the nitrogen-containing compound, and then carrying out heat treatment to obtain the platinum-based alloy catalyst; wherein, the platinum-based alloy catalyst comprises the nitrogen-doped carrier and the platinum alloy nano particles supported on the surface of the nitrogen-doped carbon carrier.

Through the method for preparing the platinum-based alloy catalyst, combination and entire design of the nitrogen-doped carrier, acid treatment and heat treatment not only can improve the physical and chemical properties such as electronic characteristic and surface alkalinity of the carbon material, increase the activity sites of the surface of the carbon material absorbing metal particles and stabilizing the metal nano particles, thereby facilitating the obtaining of the high-dispersion metal supported catalyst, but also can reduce the surface defects of the catalyst, increase the distribution of platinum on the surface layer of the catalyst so that platinum more easily binds to the nitrogen-doped carbon carrier so as to stabilize the platinum alloy nano particles supported on the surface of the nitrogen-doped carbon carrier; arrangement is regular, and therefore stability is improved. By using the above preparation method, the prepared platinum-based alloy catalyst is good in catalytic activity and stability, and is beneficial to industrialized application.

For the platinum-based alloy catalyst in one embodiment, the platinum-based alloy catalyst includes the nitrogen-doped carrier and the platinum alloy nano particles supported on the surface of the nitrogen-doped carbon carrier.

Preferably, the platinum-based alloy catalyst is prepared by using the above method for preparing the platinum-based alloy catalyst. The platinum-based alloy catalyst prepared by using the platinum-based alloy catalyst has at least one closely arranged platinum atom layer on the surface, and has good catalytic activity and stability.

Preferably, the platinum alloy nano particle comprises a platinum alloy core and a platinum shell coating on the surface of the platinum alloy core;

More preferably, the thickness of the platinum shell is 0.5 nm-1.5 nm. More preferably, the mass percentage of the platinum alloy core in the platinum alloy nano particle is 40%-75%.

Preferably, the mass percentage of nitrogen in the nitrogen-doped carrier is 1%-30%.

Preferably, the size of the nitrogen-doped carrier is 100 nm-25 μm, the specific surface area (BET) of the nitrogen-doped carrier is 200 $m^2/g$-1500 $m^2/g$. The stability of the carbon carrier can be optimized on the premise of ensuring the supporting amount of the catalyst.

Preferably, the mass percentage of the platinum alloy nano particles in the platinum-based alloy catalyst is 30%-50%.

Preferably, in the platinum alloy nano particle, the molar ratio of platinum to 3d transition metal is 1:3-5:1, which is beneficial to providing the stability of the catalyst.

A membrane electrode in one embodiment includes the above platinum-based alloy catalyst.

A fuel cell in one embodiment includes the above membrane electrode.

The platinum-based alloy catalyst and the preparation method thereof, the platinum-based alloy catalyst, the membrane electrode and the fuel cell of the disclosure will be further described in combination with examples.

Example 1

Figure 1:
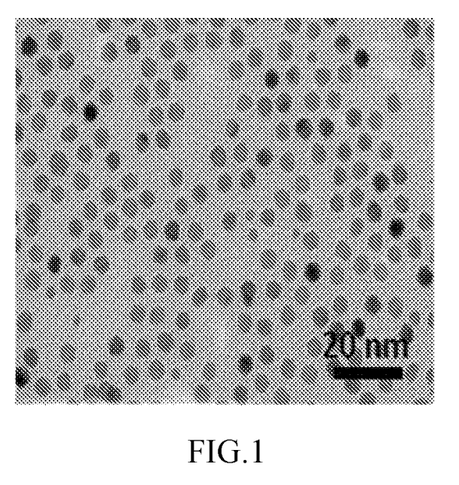
FIG. 1 is a transmission electron microscopy of catalyst alloy particles before treatment in example 1 of the disclosure.
Figure 2:
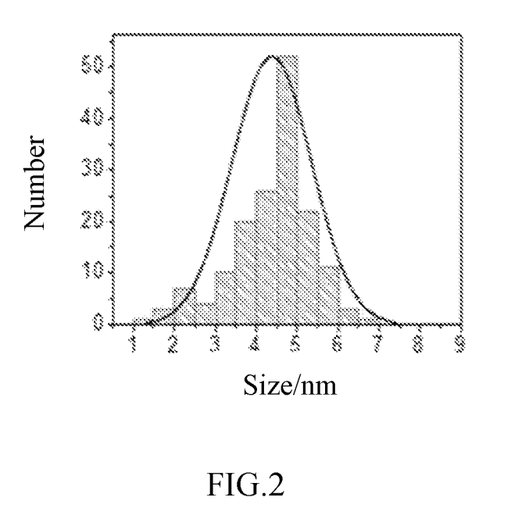
FIG. 2 is a particle diameter distribution graph of catalyst alloy particles before treatment in embodiment 1 of the disclosure.
Figure 3:
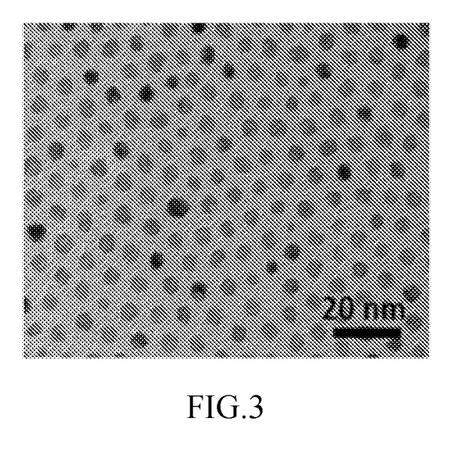
FIG. 3 is a transmission electron microscopy of catalyst alloy particles after treatment in example 1 of the disclosure.
Figure 4:
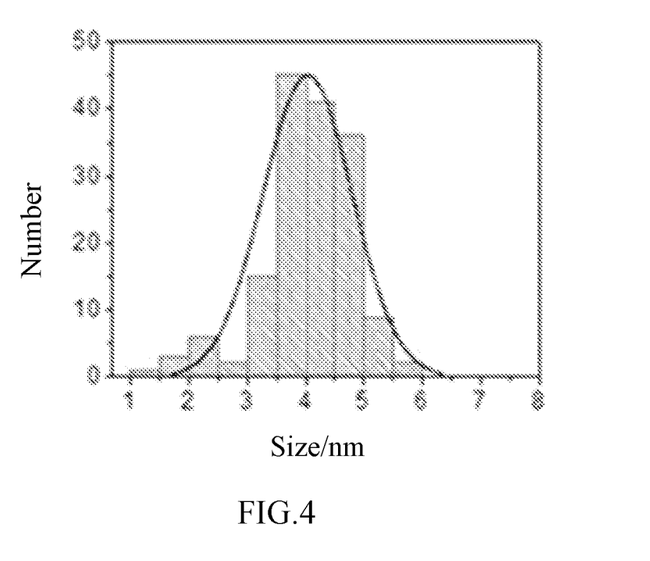
FIG. 4 is a size distribution graph of catalyst alloy particles after treatment in example 1 of the disclosure.

A method for preparing a platinum-nickel alloy catalyst provided by this example includes the following steps:

(1) platinum-nickel alloy particles having an average size of about 4.4 nm were prepared, and the atom number ratio of platinum to nickel in the prepared alloy particles was controlled to be about 1:3, as shown in FIGS. 1 and 2;

(2) acid treatment was carried out on the alloy particles prepared in step (1) for 6 h using 0.5 mol/L nitric acid aqueous solution at 70° C.;

(3) the alloy particles treated in step (2) were annealed for 14 h at 180° C. in the air to prepare the platinum-nickel alloy catalyst. The average size of the prepared platinum and nickel alloy particles was about 4.1 nm, wherein, the atom number ratio of platinum to nickel was about 3:1, as shown in FIGS. 3 and 4.

Performance Test

Samples were taken. Various performances of the catalysts before and after acid treatment and annealing were tested below, specifically see Table 1.

TABLE 1

| | Pr/Ni ratio | Electrochemical activity area (m$^2$/gPt) | Oxygen reduction specific activity (mA/cm$^2$) | Oxygen reduction mass activity (A/mgPt) |
|---|---|---|---|---|
| Starting | 72/27 | 63 | 5.5 | 1.4 |
| After 30,000 cycles | 75/25 | 59 | 6.3 | 1.5 |

Example 2

Figure 5:
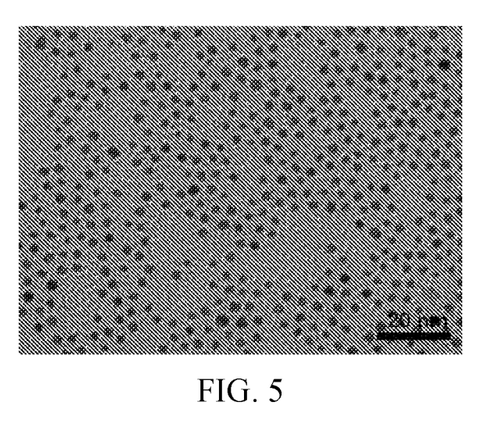
FIG. 5 is a transmission electron microscopy of catalyst alloy particles before treatment in example 2 of the disclosure.
Figure 6:
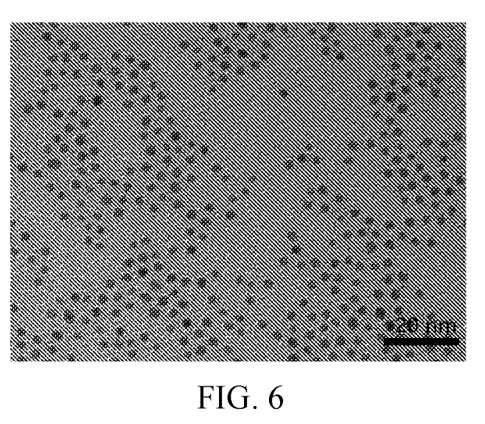
FIG. 6 is a transmission electron microscopy of catalyst alloy particles after treatment in example 2 of the disclosure.

A method for preparing a platinum-cobalt alloy catalyst provided by this example includes the following steps:

(1) platinum-cobalt alloy particles having an average size of about 2.5 nm were prepared, and the atom number ratio of platinum to cobalt in the prepared alloy particles was controlled to be about 1:3, as shown in FIG. 5;

(2) acid treatment was carried out on the alloy particles prepared in step (1) for 6 h using 0.5 mol/L sulfuric acid aqueous solution at 80° C.;

(3) the alloy particles treated in step (2) were annealed for 14 h at 180° C. in the air to prepare the platinum-cobalt alloy catalyst. The average size of the prepared platinum-cobalt alloy particles was about 2.3 nm, wherein, the atom number ratio of platinum to cobalt was about 3:1, as shown in FIG. 6.

Performance Test

Samples were taken. Various performances of the catalysts before and after acid treatment and annealing were tested below, specifically see Table 2.

TABLE 2

| | Pr/Co ratio | Electrochemical activity area (m$^2$/gPt) | Oxygen reduction specific activity (mA/cm$^2$) | Oxygen reduction mass activity (A/mgPt) |
|---|---|---|---|---|
| Starting | 72/28 | 80 | 3.5 | 1.1 |
| After 30,000 cycles | 76/24 | 75 | 3.5 | 1.0 |

Example 3

A method for preparing a platinum-iron alloy catalyst provided by this example includes the following steps:

(1) platinum-iron alloy particles having an average size of about 3.1 nm were prepared, and the atom number ratio of platinum to iron in the prepared alloy particles was controlled to be about 1:3;

(2) acid treatment was carried out on the alloy particles prepared in step (1) for 4 h using 0.5 mol/L acetic acid aqueous solution at 60° C.;

(3) the alloy particles treated in step (2) were annealed for 12 h at 200° C. in the air to prepare the platinum-iron alloy catalyst. The average size of the prepared platinum-iron alloy particles was about 2.8 nm, wherein, the atom number ratio of platinum to iron was about 3:1.

Comparative Example 1

The following performance test was carried out on the platinum-nickel catalyst and platinum-cobalt catalyst which are not subjected to the above treatments in the prior art, specifically see Table 3 and Table 4.

TABLE 3

| | Pr/Ni ratio | Electrochemical activity area (m$^2$/gPt) | Oxygen reduction specific activity (mA/cm$^2$) | Oxygen reduction mass activity (A/mgPt) |
|---|---|---|---|---|
| Starting | 60/40 | 44 | 8.5 | 1.5 |
| After 30,000 cycles | 82/18 | 30 | 3.4 | 0.4 |

TABLE 4

| | Pr/Co ratio | Electrochemical activity area (m$^2$/gPt) | Oxygen reduction specific activity (mA/cm$^2$) | Oxygen reduction mass activity (A/mgPt) |
|---|---|---|---|---|
| Starting | 66/34 | 77 | 6.2 | 1.3 |
| After 30,000 cycles | 86/14 | 53 | 1.5 | 0.2 |

It can be seen from the above data that after 30,000 cycles, the electrochemical activity areas, specific activities and quality activities of the catalyst prepared by the method of the disclosure are basically unchanged or changed little, that is to say, the catalyst can realize the stable catalytic action in the long-period operation process; however, in the prior art, after 30,000 cycles, the catalyst which is not subjected to treatment of the disclosure is significantly reduced in electrochemical activity area, specific activity and mass activity, and its stability difficultly meets commercialized application.

Example 4

100 mg of XC-72 carbon carrier (average size was 2 µm, BET was 250 m$^2$/g) was stirred for 2 h in H$_2$SO$_4$/HNO$_3$ (v/v=3:1) at room temperature and then added into 50 mL of glycol together with 200 mg of H$_2$PtCl$_6$ and 200 mg of Co(NO$_3$)$_2$ to be uniformly mixed, then 50 mg of NaBH$_4$ was added, and the carbon carrier deposited with platinum alloy nano particles was obtained after sufficient reaction.

The carbon carrier deposited with platinum alloy nano particles was washed and dried followed by first heat treatment for 4 h in an ammonia gas atmosphere at 700° C., so as to obtain a product subjected to first heat treatment.

The above product was subjected to acid treatment for 2 h in nitric acid having the pH of 1.0, and then subjected to second heat treatment for 1 h in an argon atmosphere at 250° C. after filtering and washing to obtain the platinum-based alloy catalyst in example 1.

Through characterization, in the platinum-based alloy catalyst, the mass percentage of nitrogen in the nitrogen-doped carbon carrier is 3%, and the platinum supporting amount of the platinum-cobalt nano particles on the nitrogen-doped carbon carrier is 30%. The size of the platinum-cobalt particles is 4 nm, a ratio of platinum to cobalt is 3:1, the thickness of the shell layer in the platinum-cobalt nano core-shell structure is about 0.5 nm, and the content of the core cobalt is about 45%. After cyclic voltammetry test is carried out on the platinum-cobalt alloy particle catalyst, the electrochemical surface area of the catalyst obtained in example 4 is 33.1 m$^2$/gPt.

Example 5

100 mg of XC-72 carbon carrier (average size was 2 μm, BET was 250 m²/g) was stirred for 2 h in $H_2SO_4/HNO_3$ (v/v=3:1) at room temperature and then added into 50 mL of glycol together with 200 mg of $H_2PtCl_6$ and 300 mg of $NiCl_2$ to be uniformly mixed, then 50 mg of $NaBH_4$ was added, and the carbon carrier deposited with platinum alloy nano particles was obtained after sufficient reaction.

The carbon carrier deposited with the platinum alloy nano particles was washed and dried followed by first heat treatment for 4 h in an ammonia gas atmosphere at 700° C., so as to obtain a product subjected to first heat treatment.

The above product was subjected to acid treatment for 2 h in nitric acid having the pH of 1.0, and then subjected to second heat treatment for 1 h in an argon atmosphere at 250° C. after filtering and washing to obtain the platinum-based alloy catalyst in example 5.

Example 6

100 mg of XC-72 carbon carrier (average size was 2 μm, BET was 250 m²/g) was stirred for 2 h in $H_2SO_4/HNO_3$ (v/v=3:1) at room temperature and then added into 50 mL of glycol together with 200 mg of $H_2PtCl_6$ and 200 mg of $Fe(NO_3)_3$ to be uniformly mixed, then 50 mg of $NaBH_4$ was added, and the carbon carrier deposited with platinum alloy nano particles was obtained after sufficient reaction.

The carbon carrier deposited with platinum alloy nano particles was washed and dried followed by first heat treatment for 4 h in an ammonia gas atmosphere at 700° C., so as to obtain a product subjected to first heat treatment.

The above product was subjected to acid treatment for 2 h in nitric acid having the pH of 1.0, and then subjected to second heat treatment for 1 h in an argon atmosphere at 250° C. after filtering and washing to obtain the platinum-based alloy catalyst in example 6.

Example 7

100 mg of XC-72 carbon carrier (average size was 2 μm, BET was 250 m²/g) was stirred for 2 h in $H_2SO_4/HNO_3$ (v/v=3:1) at room temperature, and then the obtained mixture was subjected to first heat treatment for 4 h at 700° C. in an argon atmosphere to obtain a nitrogen-doped carbon carrier.

The nitrogen-doped carbon carrier was added into 50 mL of glycol together with 200 mg of $H_2PtCl_6$ and 200 mg of $Co(NO_3)_2$ to be uniformly mixed, then 50 mg of $NaBH_4$ was added, and the nitrogen-doped carbon carrier deposited with the platinum alloy nano particles was obtained after sufficient reaction.

The nitrogen-doped carbon carrier deposited with the platinum alloy nano particles was subjected to acid treatment for 2 h in nitric acid having the pH of 1.0, and then subjected to second heat treatment for 1 h in an argon atmosphere at 250° C. after filtering and washing to obtain the platinum-based alloy catalyst in example 7.

Through characterization, in the platinum-based alloy catalyst, the thickness of the shell layer in the platinum-cobalt core-shell structure is about 1 nm.

Example 8

This example is different from example 4 in that the carbon carrier deposited with the platinum-cobalt nano particles was washed and dried and then uniformly mixed with 50 mg of urea, and the obtained mixture was subjected to heat treatment for 2 h at 700° C. in an argon atmosphere to obtain a product subjected to first heat treatment.

Example 9

This example is different from example 4 in that the carbon carrier deposited with the platinum-cobalt nano particles was washed and dried and then uniformly mixed with 50 mg of urea, the obtained mixture was subjected to heat treatment for 2 h at 700° C. in an air atmosphere to obtain a product subjected to first heat treatment Through characterization, in the platinum-based alloy catalyst, the thickness of the shell layer in the platinum-cobalt core-shell structure is about 1 nm.

Example 10

This example is different from example 4 in that second heat treatment was carried out in an air atmosphere, and the temperature of the second heat treatment was 150° C.

Example 11

100 mg of XC-72 carbon carrier (average size was 2 μm, BET was 250 m²/g) was stirred for 2 h in $H_2SO_4/HNO_3$ (v/v=3:1) at room temperature and then added into 50 mL of glycol together with 200 mg of $H_2PtCl_6$ and 200 mg of $Co(NO_3)_2$ to be uniformly mixed, then 50 mg of $NaBH_4$ was added, and the carbon carrier deposited with the platinum alloy nano particles was obtained after sufficient reaction.

The carbon carrier deposited with the platinum alloy nano particles was washed and dried, and the above product was subjected to heat treatment for 4 h in an ammonia gas atmosphere at 700° C., so as to obtain a platinum-based alloy catalyst in example 11.

Example 12 Membrane Electrode (MEA)

Preparation of cathode ink: 400 g of platinum-based alloy catalyst prepared in example 1 was added into a glass bottle and uniformly mixed with 10 g of deionized water (Mili-Q), 15 mg of isopropanol (IPA) and 4.5 ml of 5 wt % Nafion solution (D520) to obtain the cathode ink.

Preparation of anode ink: an HiSPEC4000 catalyst produced from Johnson Matthey was prepared into a homogeneous suspension using a method similar to the above method.

Preparation of MEA (CCM mode): an ultrasonic spray apparatus (produced from American USI, Prism 4000 mode) was used to respectively coat the above cathode ink and anode ink on the two surfaces of the proton exchange membrane (Nafion 212), the area of the catalyst layer was 5 cm², the Pt supporting amounts were respectively and quantitatively controlled to be anode 0.1 mg/cm² and cathode 0.4 mg/cm².

Example 13: Fuel cell

Two layers of 5 cm² MEA prepared in example 9 and attached 2.5 cm²*2.5 cm² gas diffusion layer (SGL 28BC, thickness was 235 μm) were selected, a gasket with a thickness of 180 μm was added between the two layers, package was carried out using a single-cell clamp, and 4.2 N-m was used for assembling to complete a single cell.

Comparative Example 2

100 mg of XC-72 carbon carrier (average size was 2 μm, BET was 250 m²/g) was stirred for 2 h in $H_2SO_4/HNO_3$ (v/v=3:1) at room temperature and then added into 50 mL of glycol together with 200 mg of $H_2PtCl_6$ and 200 mg of $Co(NO_3)_2$ to be uniformly mixed, then 50 mg of $NaBH_4$ was added, and the carbon carrier deposited with platinum alloy nano particles was obtained after sufficient reaction.

The above product was subjected to acid treatment for 2 h in nitric acid having the pH of 1.0, and then subjected to second heat treatment for 1 h in an argon atmosphere at 250° C. after filtering and washing to obtain the platinum-based alloy catalyst in comparative example 2.

Figure 7A:
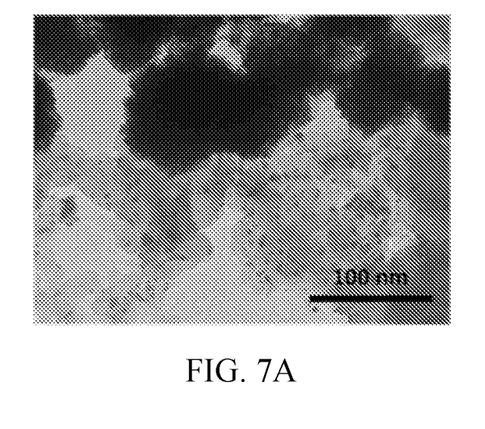
FIG. 7A is a scanning electron microscope (SEM) graph of a platinum-based alloy catalyst prepared in comparative example 2 of the disclosure.
Figure 7B:
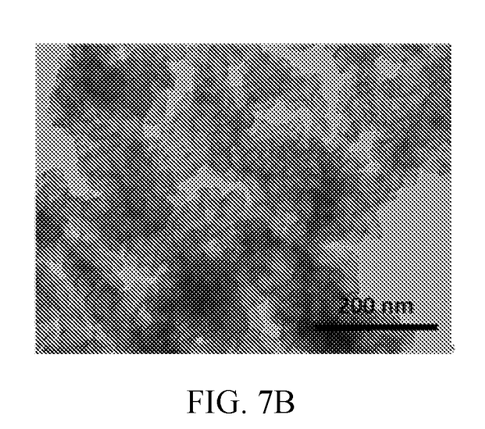
FIG. 7B is a scanning electron microscope (SEM) graph of a platinum-based alloy catalyst prepared in comparative example 4 of the disclosure.

The platinum-based alloy catalysts prepared in comparative example 2 and comparative example 4 were subjected to SEM characterization, so as to respectively obtain FIG. 7A and FIG. 7B. It can be seen from comparison between FIG. 7A and FIG. 7B that in the platinum-based alloy catalyst prepared in example 4, the platinum-cobalt nano particles on the nitrogen-doped carbon carrier have good supporting uniformity, indicating that the preparation method of the present application improves the supporting uniformity of the platinum alloy nano particles on the nitrogen-doped carbon carrier. After the platinum-cobalt alloy carbon particle catalyst is subjected to cyclic voltammetry test, the electrochemical surface area of the catalyst obtained in example 2 is 49.1 $m^2/gPt$.

Comparative Example 3

100 mg of XC-72 carbon carrier (average size was 2 μm, BET was 250 $m^2/g$) was stirred for 2 h in $H_2SO_4/HNO_3$ (v/v=3:1) at room temperature and then added into 50 mL of glycol together with 200 mg of $H_2PtCl_6$ and 300 mg of $NiCl_2$ to be uniformly mixed, then 50 mg of $NaBH_4$ was added, and the carbon carrier deposited with platinum alloy nano particles was obtained after sufficient reaction.

The above product was subjected to acid treatment for 2 h in nitric acid having the pH of 1.0, and then subjected to second heat treatment for 1 h in an argon atmosphere at 250° C. after filtering and washing to obtain the platinum-based alloy catalyst in comparative example 3.

Figure 8A:
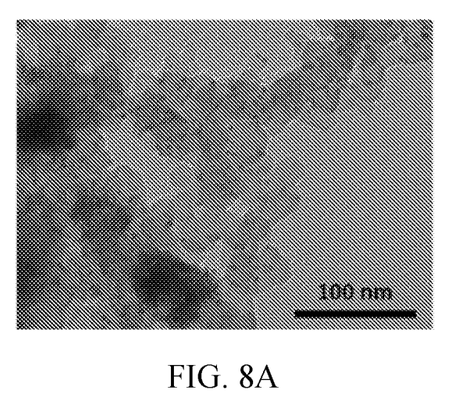
FIG. 8A is a scanning electron microscope (SEM) graph of a platinum-based alloy catalyst prepared in comparative example 3 of the disclosure.
Figure 8B:
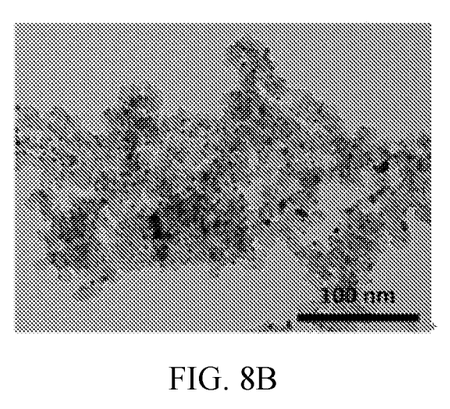
FIG. 8B is a scanning electron microscope (SEM) graph of a platinum-based alloy catalyst prepared in comparative example 5 of the disclosure.

The platinum-based alloy catalysts prepared in comparative example 3 and comparative example 5 were subjected to SEM characterization, so as to respectively obtain FIG. 8A and FIG. 8B. It can be seen from comparison between FIG. 8A and FIG. 8B that in the platinum-based alloy catalyst prepared in example 5, the platinum-nickel nano particles on the nitrogen-doped carbon carrier have high supporting amount, indicating that the preparation method of the present application improves the supporting amount of the platinum alloy nano particles on the nitrogen-doped carbon carrier.

Comparative Example 4

100 mg of XC-72 carbon carrier (average size was 2 μm, BET was 250 $m^2/g$) was stirred for 2 h in $H_2SO_4/HNO_3$ (v/v=3:1) at room temperature and then added into 50 mL of glycol together with 200 mg of $H_2PtCl_6$ and 200 mg of $Fe(NO_3)_3$ to be uniformly mixed, then 50 mg of $NaBH_4$ was added, and the carbon carrier deposited with platinum alloy nano particles was obtained after sufficient reaction.

The above product was subjected to acid treatment for 2 h in nitric acid having the pH of 1.0, and then subjected to second heat treatment for 1 h in an argon atmosphere at 250° C. after filtering and washing to obtain the platinum-based alloy catalyst in comparative example 4.

Comparative Example 5

100 mg of XC-72 carbon carrier (average size was 2 μm, BET was 250 $m^2/g$) was stirred for 2 h in $H_2SO_4/HNO_3$ (v/v=3:1) at room temperature and then added into 50 mL of glycol together with 200 mg of $H_2PtCl_6$ and 200 mg of $Co(NO_3)_2$ to be uniformly mixed, then 50 mg of $NaBH_4$ was added, and the carbon carrier deposited with platinum alloy nano particles was obtained after sufficient reaction.

The carbon carrier deposited with the platinum alloy nano particles was washed and dried, and then the dried carbon carrier was subjected to heat treatment for 4 h in an ammonia gas atmosphere at 700° C., so as to obtain the platinum-based alloy catalyst in comparative example 5.

The platinum-based alloy catalysts in examples 4-11 and comparative examples 2-5 were respectively subjected to X-ray photoelectron spectroscopy (XPS) analysis and stability test, wherein, the stability performance test process was as follows:

The rotating disk electrode (RDE) was assembled for test. The electrolyte was 0.1 M $HClO_4$ aqueous solution saturated with $N_2$. The test condition was 0.6V-1.0V, and the scanning speed was 200 mV/s. The test instrument is CHI730D electrochemical analyzer (CHI Instruments Inc., U.S.) equipped with rotating disk electrode system (U.S.).

Test results are as shown in Table 3

TABLE 5

Test data of platinum-based alloy catalysts in examples 4-11 and comparative examples 2-5

| Number | Nitrogen doping amount | Element component ratio | Specific activity (mA/$cm^2$) | Electro-chemical surface area ($m^2/gPt$) | Retention rate after 20,000 cycles |
|---|---|---|---|---|---|
| Example 1 | 3% | Pt:Co = 3:1 | 1.12 | 32.5 | 90.5% |
| Example 2 | 3% | Pt:Ni = 3:1 | 1.25 | 32.5 | 89.7% |
| Example 3 | 3% | Pt:Fe = 3:1 | 0.83 | 32.5 | 88.7% |
| Example 4 | 3% | Pt:Co = 3.5:1 | 1.1 | 32.5 | 92.2% |
| Example 5 | 2.5% | Pt:Co = 3:1 | 1.17 | 33.1 | 89.6% |
| Example 6 | 2.5% | Pt:Co = 3.5:1 | 1.0 | 33.1 | 91.5% |
| Example 7 | 3% | Pt:Co = 3:1 | 1.35 | 32.5 | 91.2% |
| Example 8 | 2.5% | Pt:Co = 3:1 | 1.22 | 33.1 | 92.5% |
| Comparative example 1 | 0 | Pt:Co = 3:1 | 0.55 | 49.1 | 83% |
| Comparative example 2 | 0 | Pt:Ni = 3:1 | 0.64 | 49.1 | 82.5% |
| Comparative example 3 | 0 | Pt:Co = 1.5:1 | 1.5 | 49.1 | 62% |
| Comparative example 4 | 3% | Pt:Co = 1.5:1 | 1.8 | 32.5 | 63% |

It can be seen from Table 5 that by comparing with the platinum-based alloy catalysts in comparative examples 2-5, the platinum-based alloy catalysts in examples 4-11 have high specific activity and retention rate after 20,000 cycles, indicating that after the platinum-based alloy catalysts in examples 4-11 are subjected to twice heat treatment, the platinum alloy nano particles supported on the surface of the nitrogen-doped carbon carrier are more stable and more regular in arrangement, thereby obtaining good catalytic activity and stability.

Each technical feature of the above-mentioned embodiment can be arbitrarily combined. In order to make the description concise, all possible combinations of each technical feature in the above-mentioned embodiment are not described. However, as long as the combination of these technical features is not contradictory, it shall be considered as the scope of the description.

The above-mentioned examples only express several embodiments of the disclosure, and the description is more specific and detailed, but cannot be understood as limiting the scope of the invention patent. It should be noted that persons of ordinary skill in the art can also make several deformations and improvements without departing from the concept of the disclosure, which belong to the protection scope of the disclosure. Therefore, the protection scope of the present invention patent shall be based on the attached claims.

What is claimed is:

1. A preparation method of a platinum-based alloy catalyst, comprising the following steps:
   (1) preparing nano-sized alloy particles made up of platinum and a 3d transition metal;
   (2) carrying out an acid treatment on the nano-sized alloy particles prepared in step (1), wherein the acid treatment is carried out at 40-90° C.; and
   (3) annealing the nano-sized alloy particles treated in step (2), wherein an annealing temperature is 100-200° C. and the annealing is carried out in open air.

2. The preparation method of the platinum-based alloy catalyst according to claim 1, wherein in step (1), an atom number ratio of platinum to the 3d transition metal in the nano-sized alloy particles is controlled to be 1: (1-5).

3. The preparation method of the platinum-based alloy catalyst according to claim 2, wherein in step (1), the atom number ratio of platinum to the 3d transition metal in the nano-sized alloy particles is controlled to be 1: (1-3).

4. The preparation method of the platinum-based alloy catalyst according to claim 1, wherein in step (1), a size of the nano-sized alloy particles is controlled to be 2-6 nm.

5. The preparation method of the platinum-based alloy catalyst according to claim 1, wherein in step (2), an atom number ratio of platinum to the 3d transition metal in the nano-sized alloy particles subjected to the acid treatment is controlled to be 1: (0.1-0.8).

6. The preparation method of the platinum-based alloy catalyst according to claim 5, wherein in step (2), the atom number ratio of platinum to the 3d transition metal in the nano-sized alloy particles subjected to the acid treatment is controlled to be 1: (0.3-0.7).

7. The preparation method of the platinum-based alloy catalyst according to claim 1, wherein in step (2), an acid used for the acid treatment is one or a combination of acids selected from the list consisting of acetic acid, sulfuric acid, nitric acid and perchloric acid.

8. The preparation method of the platinum-based alloy catalyst according to claim 1, wherein in step (2), the acid treatment is carried out on the nano-sized alloy particles using an acidic aqueous solution having a concentration of 0.1-2 mol/L.

9. The preparation method of the platinum-based alloy catalyst according to claim 1, wherein in step (3), an annealing time is controlled to be 4-20 h.

10. The preparation method of the platinum-based alloy catalyst according to claim 1, wherein the 3d transition metal is one or a combination of 3d transition metals selected from the list consisting of iron, cobalt and nickel.

* * * * *

UNITED STATES PATENT AND TRADEMARK OFFICE
CERTIFICATE OF CORRECTION

| | |
|---|---|
| PATENT NO. | : 10,957,915 B2 |
| APPLICATION NO. | : 16/982591 |
| DATED | : March 23, 2021 |
| INVENTOR(S) | : Jie Zhang et al. |

Page 1 of 1

It is certified that error appears in the above-identified patent and that said Letters Patent is hereby corrected as shown below:

On the Title Page

Item (73) The Assignee's Name should be read as below:
--QINGDAO CHUANGQI XINNENG CATALYSIS TECHNOLOGY CO., LTD--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*